Feb. 24, 1953

H. R. BALDWIN 2,629,355

COVER DROPPER

Filed March 14, 1950

INVENTOR.
HAROLD R. BALDWIN
BY
Harry N. Hitzeman
ATTORNEY

Feb. 24, 1953    H. R. BALDWIN    2,629,355
COVER DROPPER

Filed March 14, 1950    10 Sheets-Sheet 6

INVENTOR.
HAROLD R. BALDWIN
BY
Harry H. Hitzeman
ATTORNEY

Feb. 24, 1953 H. R. BALDWIN 2,629,355
COVER DROPPER
Filed March 14, 1950 10 Sheets-Sheet 7

INVENTOR.
HAROLD R. BALDWIN
BY
Harry N. Hitzeman
ATTORNEY.

Feb. 24, 1953   H. R. BALDWIN   2,629,355
COVER DROPPER
Filed March 14, 1950   10 Sheets-Sheet 8

INVENTOR.
HAROLD R. BALDWIN
BY Harry H. Hilgeman
ATTORNEY.

Patented Feb. 24, 1953

2,629,355

UNITED STATES PATENT OFFICE 2,629,355

COVER DROPPER

Harold R. Baldwin, Carpentersville, Ill., assignor to Elgin Manufacturing Company, a corporation of Illinois Application March 14, 1950, Serial No. 149,619

4 Claims. (Cl. 113—114)

This invention relates generally to can filling mechanism and similar mechanism.

The present invention relates more particularly to new and useful improvements in feed mechanism such as is employed for supplying can covers, one at a time, to the open type of cans during a can filling operation.

In general, the object of this invention is to provide a cover dropping mechanism whereby can covers stacked in a magazine may be individually separated from the stack and placed in position on the top of a can in accurate registry therewith without the necessity of employing any intermediate conveyor mechanism between the can cover magazine and the can conveyor.

Another object of the invention is to provide such a can feed mechanism widely adjustable and adapted to satisfactorily handle can covers of different diameters, shapes, and of different styles such as, for example, a single friction and a double friction type of cover.

Another object of the invention is to provide a cover feed mechanism adjustable within wide limits between the minimum size and maximum size of the cans and covers to be handled, both as to the diameter and to the height of the cans.

A further object of the invention is to provide automatic means whereby the can covers may be accurately registered upon the top of the cans as the cans are carried by the conveyor with a continuous or an intermittent motion.

Another object of the invention is to provide means for synchronizing the operation of the can cover feed in accordance with the movement of the cans along the conveyor and independently of the movement of the conveyor itself.

Another object of the invention is to provide a cover dropping mechanism whereby a can cover may be partially released from the cover magazine and may be engaged by the can to be covered and drawn from its position in the cover magazine by the motion of this can.

A further object is to provide a modified construction wherein an adjustable conveyor is associated with the can cover magazine and capable of adjustment therewith.

A further object is to provide an automatic cover centering device in association with the can cover conveyor whereby each cover is assured of being located directly over the top of an open can as the same passes thereunder.

A still further object of this invention is to provide a can cover feed means simple in construction, dependable in operation and easily accessible for repair or replacement.

Other objects and advantages will be more apparent from the following description wherein reference is had to the accompanying drawings, upon which

Fig. 8-a is a plan view thereof;

In the normal course of can filling operations it is the usual practice to provide a conveyor, cans spaced thereon and carried thereby, a can cover magazine and a cover feed mechanism associated therewith and adapted to position a cover upon each can during its movement along the conveyor. In practice a number of problems have been encountered in the construction of machinery for this purpose, as for example, the necessity of providing a single machine adaptable to handle covers of various diameters and adaptable to feed these covers to cans of different heights. It has also been found difficult in certain instances to provide means whereby the can covers may be accurately registered upon the tops of cans. The fact that the cans as carried by the conveyor may be uniformly spaced thereon or may be spaced at irregular intervals makes the accurate registry of the can covers therewith more difficult.

In the present invention these difficulties have been overcome by virtue of can feeding mechanism wherein the can feed is regulated by the movement of the cans themselves in such a manner that a can carried by the conveyor will cause the cover feed mechanism to operate at the exact time that the can comes into position to receive the cover. In the preferred embodiment of the invention, a conveyor of any usual style may be employed and a cover magazine may be held in spaced relationship above this conveyor in such a manner that the cans as carried by the conveyor will pass directly below the vertical axis of the cover magazine.

It has been found desirable to construct this cover magazine of a number of parallel vertical rods and provide adjustable mechanism for varying the spacing between these rods in order that the mechanism may be adapted for various diameters of can covers. It has also been found desirable to construct one of the vertical rods of inter-connecting sections so that a portion or section can be easily removed to permit easy loading of the magazine.

Adjacent the lower end of the magazine improved release cams are provided, these cams having lips supporting the stack of can covers and cam portions operative to release one cover at a time from the bottom of the stack when the release cams are operated. In one of the illustrative embodiments of the invention, two of these cams are provided, their motion being synchronized by a link mechanism and their operation being controlled by a solenoid which is in turn operated by a switch actuated by the cans themselves as they move under the cover feed mechanism. In order that various heights of can may be covered, the entire mechanism is mounted upon a vertical slide in such a manner that the distance between the lower end of the can cover magazine and the surface of the conveyor may be adjusted at will.

In the embodiment of the invention in which I have chosen to illustrate the same. I provide a vertically disposed support or slideway 10 positioned adjacent a conveyor 11 which may be of any conventional type, but is here illustrated in its simplest form, that is, of a common belt conveyor. A frame casting 12 is carried by the vertical support 10 and may have a screw-threaded opening 13 in which is threaded a vertical adjusting screw 14 rotatable by the hand wheel 15 secured to its upper end. The hub 16 of the hand wheel 15 bears against the boss 17 of the vertical support 10 and the shaft 14 is freely rotatable therein in such a manner that the frame casting 12 may be raised or lowered in the slideway of the support 10 by the rotation of the hand wheel 15.

Shoulder portions 18 are provided upon the frame casting 12 and are adapted to bear against one side of the slideway 10 while a clamping plate 19 is carried on the opposite side of the slideway 10 by means of two threaded clamping screws 20 carrying hand wheels 21. It will thus be seen that the frame casting 12 may be moved to a predetermined vertical position by the rotation of the hand wheel 15 and the threaded shaft 14, and may be then locked in position by tightening the clamping screws 20 by means of the hand wheels 21. It is upon this frame casting 12 that the entire can cover magazine and releasing feed mechanism are supported. On the frame casting 12 bosses 22 and 23 are provided and slide rods 24 and 25 are mounted therein. An adjustable frame casting 26 is slidably mounted upon the slide rods 24 and 25 by means of bosses 27 and 28.

Mounted in the frame casting 12 above the slide rods 24 and 25 adjusting screws 29 and 30 are provided. These screws carry bevel gears 31 and 32 meshing with corresponding bevel gears 33 and 34 carried by the crank shaft 35 journalled in bearings 36 and 37 and carrying the crank 38. It will be seen that the rotation of the crank 38 will be effective to rotate both of the adjusting screws 29 and 30 simultaneously and in an equal amount. A thumb screw 39 has been provided in the bearing 37 to bear against the shaft 34 and thus lock the adjusting screws in any predetermined position. The free ends of the adjusting screws 29 and 30 are threaded into bosses 40 and 41 in the adjustable frame casting 26, and it will be seen that their rotation will therefore move the adjustable frame casting 26 to or from the frame casting 12.

Figure 1:
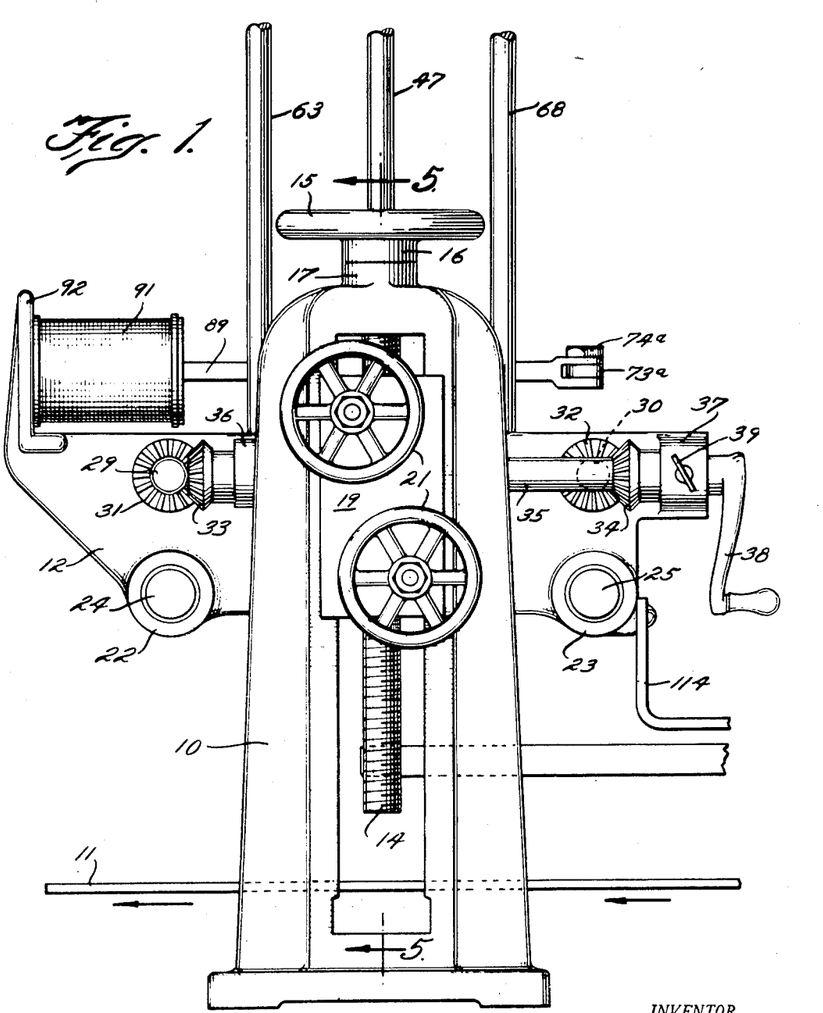
Fig. 1 is a side elevational view of my improved mechanism showing generally the way it may be mounted overlying a filled can conveyor.
Figure 2:
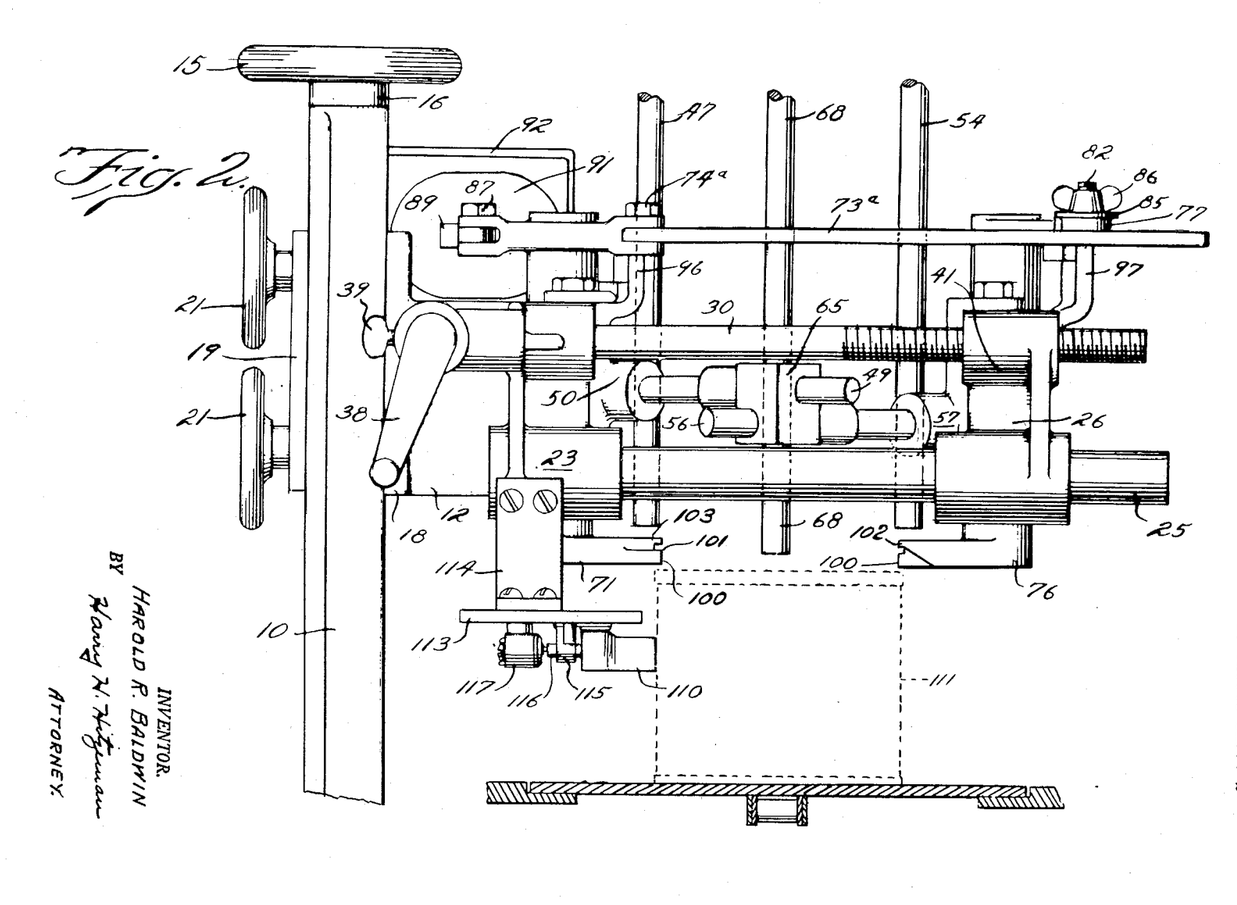
Fig. 2 is an end elevational view looking from the right of Fig. 1.

Secured to the frame casting 12 by means of cap screws 45 is a bracket 46 carrying a vertical rod 47 and carrying slide rods 48 and 49 mounted in bosses 50. The adjustable frame casting 26 carries a similar bracket 52 mounted thereon by means of cap screws 53 and carrying a vertical rod 54 and slide rods 55 and 56 mounted in the bosses 57. As may be seen in Fig. 2, the slide rods carried by the bracket 52 are at a different elevation than those carried by the bracket 46; and as can be seen in Figs. 3 and 4, the slide rod 48 intersects and crosses the slide rod 45 while the slide rod 49 intersects and crosses the slide rod 56.

At the intersection of the slide rods 48 and 55 is mounted a floating bearing block 60 having bearing portions 61 and 62 slidably mounted on the slide rods 48 and 55 respectively. This floating bearing block 60 also carries a vertical rod 63. At the intersection of the slide rods 49 and 56 a floating bearing block 65 is provided having bearings 66 and 67 upon the slide rods 49 and 56 respectively. This floating bearing block 65 also carries a vertical rod 68. The vertical rods 47, 54, 63, and 68 are of substantially the same dimensions and cooperate to form and define a magazine wherein a stack of can covers 69 may be placed.

Journalled in the frame casting 12 is a vertical cam shaft 70 carrying a cam 71 at its lower end. At the upper end of this cam shaft 70 is mounted a bell crank 72 and immediately below this is an enlarged portion or collar 73 and a thrust bearing 74. Journalled within the adjustable casting 26 is a similar vertical cam shaft 75 carrying at its lower end a cam 76. A crank 77 is provided at its upper end and immediately therebelow is an enlarged portion or collar 78, and a thrust bearing 79.

Figures 3, 7:
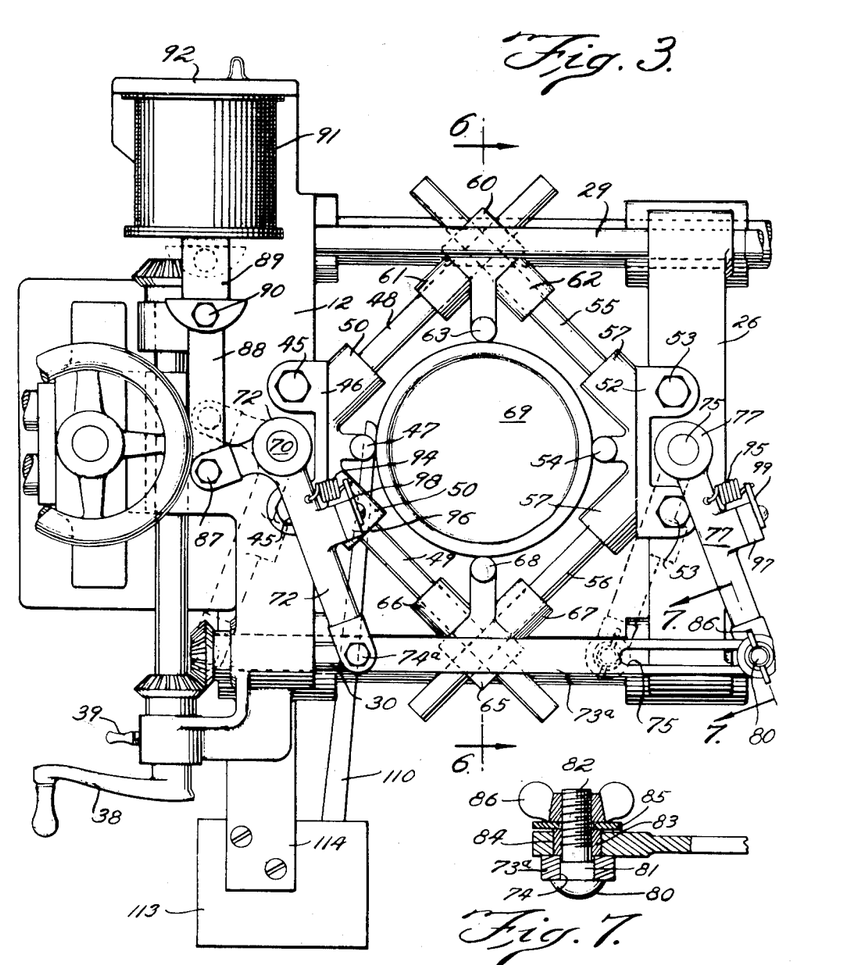
Fig. 3 is a top plan view of my improved mechanism.
Fig. 7 is a detailed sectional view taken on the line 7—7 of Fig. 3 showing one of the connections between the cam oscillating arms.
Figure 4:
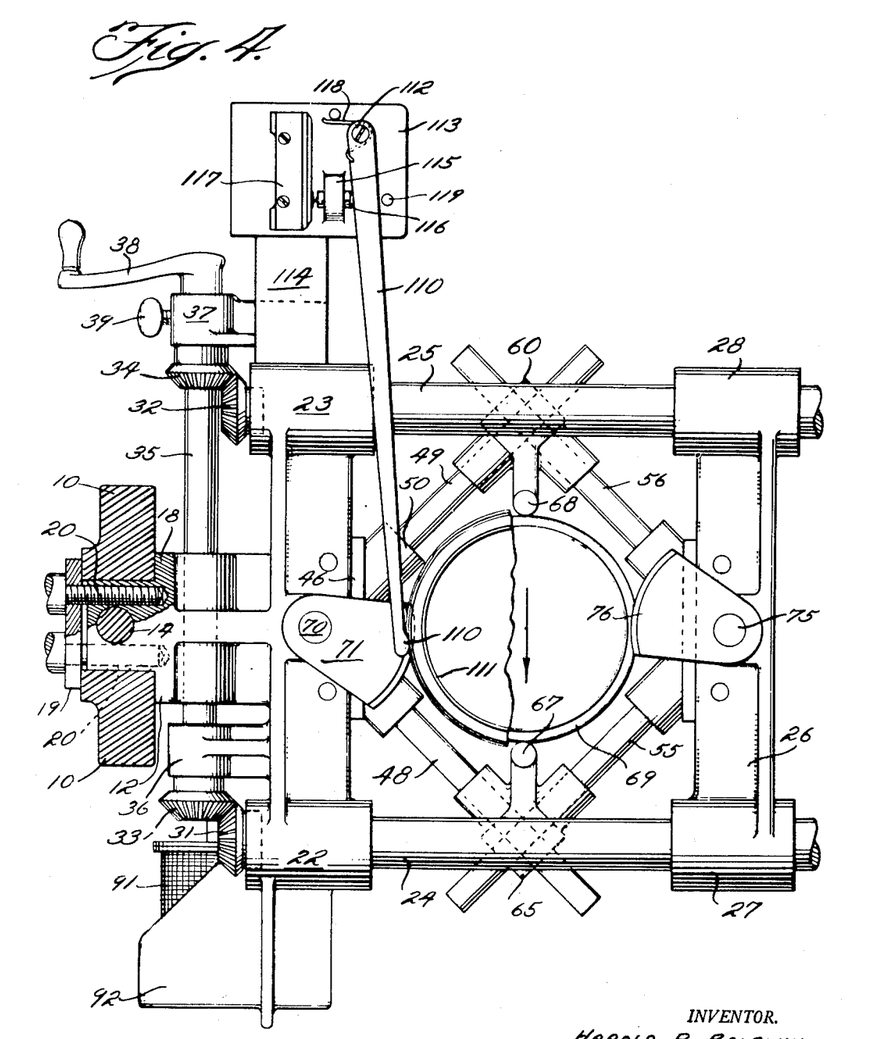
Fig. 4 is a bottom plan view thereof with parts broken away in section to more clearly show other parts.

Referring now to Fig. 3, it will be seen that the bell crank 72 carries a link 73a pivoted as at 74a. At the opposite end of the link 73a an elongated slot 75 is provided whereby the crank 77 may be adjustably secured. With reference now to Fig. 7, it may be seen that a bolt 80 is provided having a squared portion 81 adapted to ride in the slot 74a of the link 73a. The upper threaded portion 82 of the bolt 80 carries a sleeve 83 penetrating an opening 84 in the end of the crank 77. It will be noted that this sleeve 84 is of slightly greater length than the thickness of the crank 77 and that a washer 85 and thumb nut 86 are provided. From this it will be seen that the rotation of the thumb nut 86 will clamp the bolt 80, link 73a, sleeve 83, washer 85 and thumb nut 86, but will leave the entire mechanism free to rotate upon the sleeve 83 in the crank 77. By this structure it is possible to adjust the position of the bolt 80 along the elongated slot 75 of the link 73a in accordance with the spacing established between the frame casting 12 and the adjustable casting 26 by means of the adjusting screws 29 and 30.

Connected to the bell crank 72 by means of stud 87 is a link 88 pivoted to a solenoid core 89 by means of a stud 90. This core 89 operates within a solenoid coil 91 carried by an extension 92 of the frame casting 12. Referring now to Fig. 3 it will be seen that when the solenoid coil 91 is energized, the core 89 is drawn inwardly and the bell crank 72 is rotated from the solid line position to the position as shown in the dotted lines of the drawings in Fig. 3. It will also be seen that the crank 77 will be drawn from its solid line position to the dotted line position by the link 73a. A spring 94 is provided on the bell crank 72 and a spring 95 is provided on the crank 77 for the purpose of returning these members to their original position when the solenoid coil is de-energized. At this time the cranks 72 and 77 contact stop members 96 and 97 which limit their movement. The springs 94 and 95 may be mounted in any suitable manner as by means of brackets 98 and 99 affixed to the stop members 96 and 97.

Figure 5:
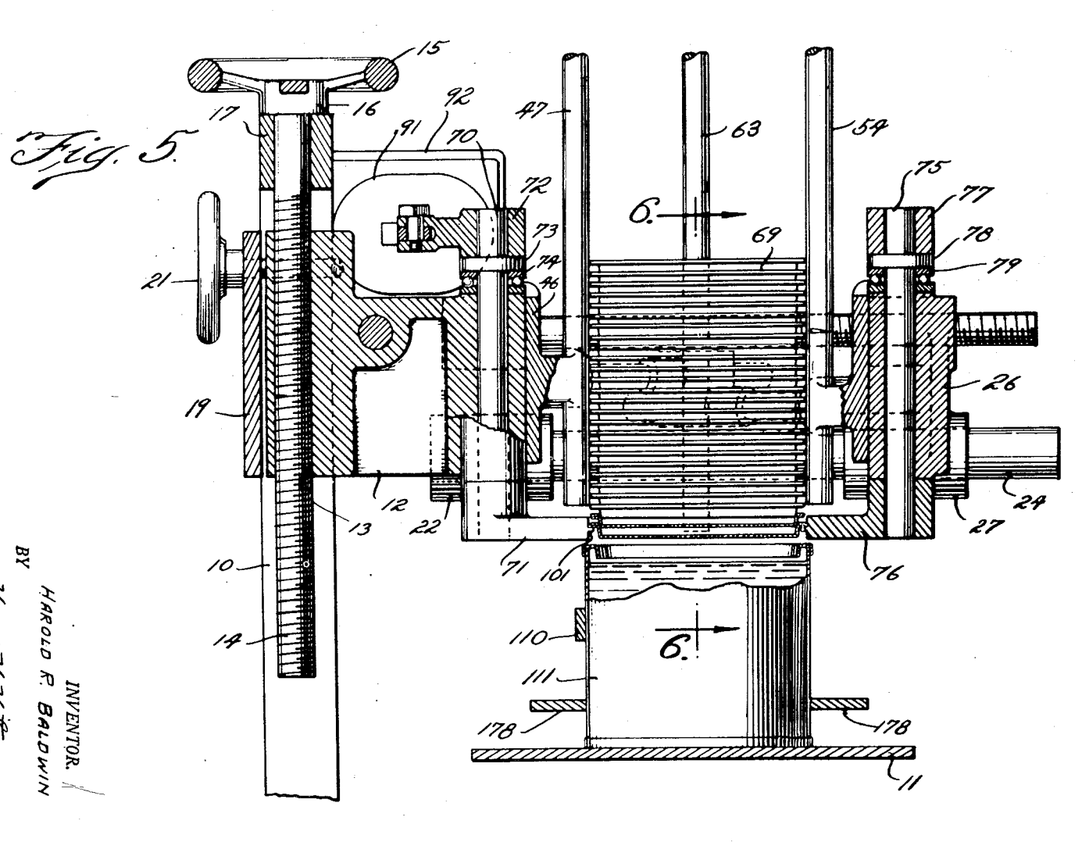
Fig. 5 is a vertical sectional view taken on the line 5—5 of Fig. 1.
Figure 6:
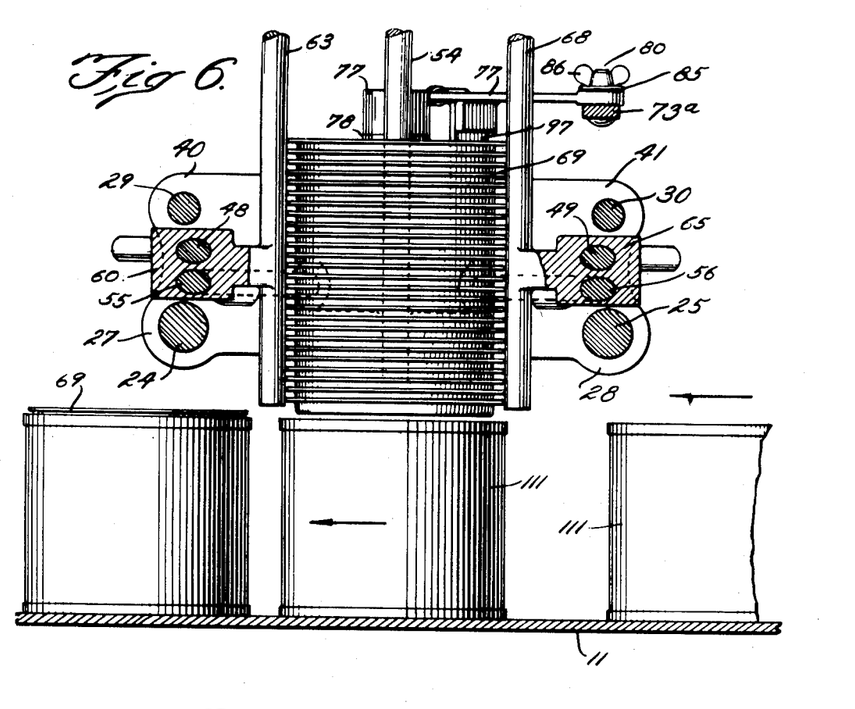
Fig. 6 is a vertical sectional view taken on the line 6—6 of Fig. 5.

It can now be seen that the operation of the solenoid 91 will cause the vertical cam shafts 70 and 75 to rotate through a certain pre-determined arc. The lower ends of these vertical cam shafts 70 and 75, as hereinbefore stated, carry cams 71 and 76. One of these cams is shown in perspective in Fig. 8. It will be noted that the cam body 76 has a substantially arcuate surface 100, upon which is carried a projecting lip 101 and a ridge portion 102 including an entering edge 103. As will be seen in Figs. 2 and 5, these cams 71 and 76 are so positioned below the stack of covers 69 that the covers normally rest upon and are supported by the lip 101. When the solenoid is energized, the cams move in an oscillating direction as indicated by the arrows in Fig. 8-a, but in opposite and opposing directions, at which time the entering edge 103 of the ridge portion 102 engages between the flange of the lowermost cover and that of the second cover and wedges them apart, holding the stacked covers and affording free movement of the lowest cover so that it may be released. Simultaneously the lip 101 moves out from beneath the lower cover and allows this cover to drop directly down. It should be noted that the direction of the movement of the cams 71 and 76 is such that there is no tendency to dislocate the lowermost cover from its axial alignment with the remainder of the stack. It should also be noted that the arcuate face 100 of the cams 71 and 76 continues somewhat beneath the lip 101 and thereby prevents any possibility of the released cover moving transversely of the direction of the travel of the cam.

With the improved cam construction which I have provided, the lowermost can cover is released without raising the stack in any way and the covers are dropped by gravity on the can.

Since this cover release mechanism is electrically operated, means must be provided whereby a solenoid coil will be energized at the exact moment that a can carried by the conveyor 11 comes into axial alignment under the stack of covers 69. To accomplish this a trigger arm 110 is provided, the end of which is adapted to engage the can 111 in such a manner that the trigger arm 110 will be moved about its pivot 112. This pivot 112 may be mounted in any suitable manner, but for purposes of illustration, it is shown as being carried by the plate 113 mounted on the frame casting 12 by means of the bracket 114. In a bushing 115 on the plate 113 is a slide 116 whereby the motion of the trigger arm 110 is transmitted to an electric switch mechanism 117 of any desired type. In this connection it will be seen that it is desirable to have a switch mechanism of a type that will operate positively with a very small amount of movement.

By reference to Fig. 4 it will be seen that when the can 11 contacts the end of the trigger arm 110, this trigger arm will actuate the switch mechanism 117 mounted upon the plate 113 and cause the operation of the release cams 71 and 76 which will be effective to drop one of the covers 69 upon the can 111. The coil spring 118 serves to return the trigger arm 110 to its normal position as limited by the stop 119.

It should be noted that the magazine containing the stack of covers 69 is made up of the four vertical rods, 47, 54, 63 and 68, and that by adjustment of the crank 38, these vertical rods will assume positions suitable to accommodate can covers a great deal larger or a great deal smaller than those shown in the drawings. It is to be noted, however, that this adjustment is accomplished by moving the vertical rod 54 directly away from the rod 47, and thus causing the slides to operate in such a manner that the vertical rods 63 and 68 will be moved angularly away from the rod 47, but that the rod 47 remains in the same axial position at all times. Thus, when an adjustment is made to accommodate a can cover of a different diameter, the central axis of the stack of can covers changes, but the tangent point at which the side of the can contacts the end of trigger arm 110 remains unchanged.

By making the adjustment in this manner, it is possible to vary the diameter of the cans used within any predetermined limits without the necessity of making any readjustment of the trigger arm 110. It will be seen that this is greatly advantageous in that changes from one diameter can to another may be made rapidly and with a minimum of inconvenience.

It should also be noticed that when any adjustment is made to vary the diameter of the magazine, a corresponding adjustment must be made on the effective length of the link 73 by means of changing the position of the bolt 82 in the elongated slot 75. It should be noted, however, that the proper effective length of this link is automatically determined by the adjustment as effected by the crank 38. In order that this be done, it is only necessary that the thumb nut 86 be loosened before or after the adjustment is made. When this is done the springs 94 and 95 will act to bring the cranks 72 and 77 against their respective stops 96 and 97 as shown in the full line positions in Fig. 3. The thumb nut 86 being loosened, a squared portion 81 of the bolt 80 may slide freely along the elongated slot 75 and will assume its correct position therein, since both cranks are maintained in their proper initial positions by means of the stops 96 and 97. The thumb nut 86 may then be tightened, whereupon the bolt 82 becomes positively clamped in its proper position along the elongated slot 75 in the link 73a.

Figure 9:
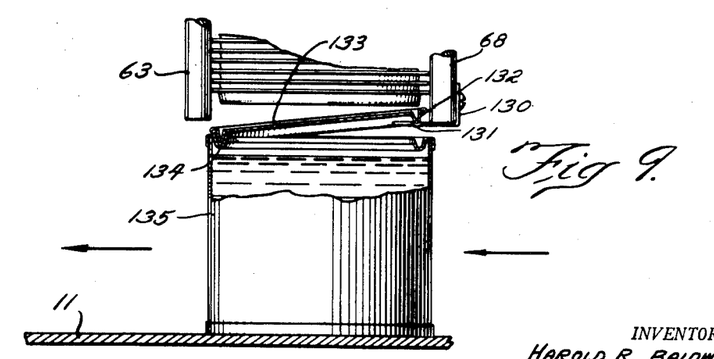
Fig. 9 is a fragmentary vertical sectional view of a modified form of the magazine and particularly adaptable to the double friction type of can cover.
Figure 10:
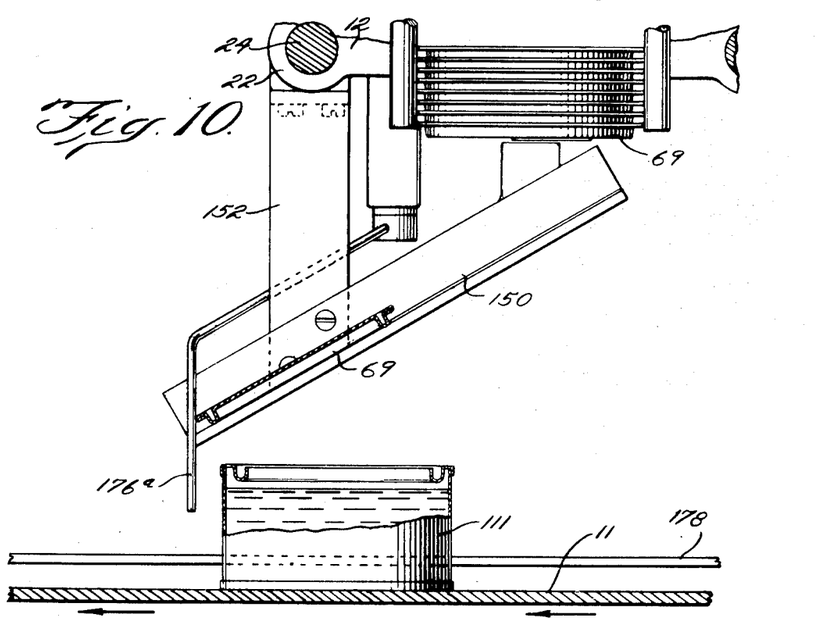
Fig. 10 is a fragmentary side elevational view adjacent the lower end of the can cover magazine showing a modified construction including a slideway for the can covers.
Figure 11:
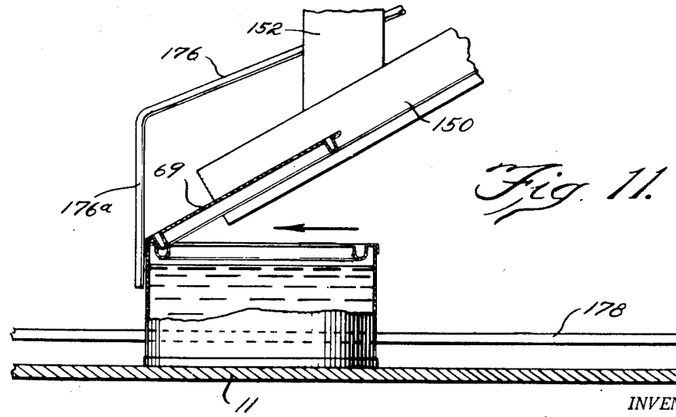
Fig. 11 is a fragmentary view of a portion of the parts shown in Fig. 10 with the can and can cover in a changed position.

In Fig. 9 a slightly modified form of the invention is shown, which has been found particularly adaptable to the double friction type of can covers. This construction differs from the construction described only in that a lip 130 is secured to the lowermost end of the vertical rod 68, and this lip 130 has a depressed portion 131 therein which is effective to engage the friction rim 132 of the double friction cap 133 and arrest its downward movement until the leading edge of the cover 133 has found its proper position in the groove 134 of the double friction type can 135. In this position the cover 133 has engaged the can while still remaining in axial alignment with the stack, and the continued forward motion of the cans 135 as carried by the conveyor 11 will cause the cover 133 to be drawn from the lip 130 and fall into perfectly registered position on the top of the can 135.

In Figs. 10 to 13 inclusive, I have shown a modified form of the invention wherein I provide an adjustable conveyor associated with the can cover magazine and capable of directing the can covers that have been released downwardly at an angle against a stop positioned in the path of the cans 111 passing forwardly beneath the can cover magazine. The conveyor may comprise a pair of spaced angle iron members 150 secured by suitable brackets 152 beneath the hub portions 22 of the casting 12 and the hub portion 27 of the casting 26. The angle members 150 are placed at an angle extending forwardly and downwardly into the path of the cans 111 passing beneath the cover magazine on the conveyor 11. I also provide a bracket 154 secured to the casting 12 by means of cap screws 156 and formed with a pair of arm portions 158 and 160. The arm portions 158 and 160 are provided with aligned vertical holes 162 and 164 through which a vertically disposed rod member 168 is positioned. The rod member 168 is formed with a rigid collar portion 170 adjacent its upper end through which one end of a coiled spring member 172 may be fastened. The opposite end of the coiled spring 172 may be fastened in a suitable opening in the arm 158. The lower end of rod 168 is provided with a shoulder portion 174.

A can cover centering device in the form of a wire member 176 is extended from the shoulder portion 174 of the vertical rod 168. The wire member may extend to a point generally centrally between the angle members 150 of the conveyor and have a portion 176a extending downwardly below the bottom end of the same. It will be noted that the coiled spring 172 holds the wire member 176 in the position shown in Figs. 12 and 13 and permits the same to be moved in a counter-clockwise direction, as will presently be more apparent.

Figures 12, 13:
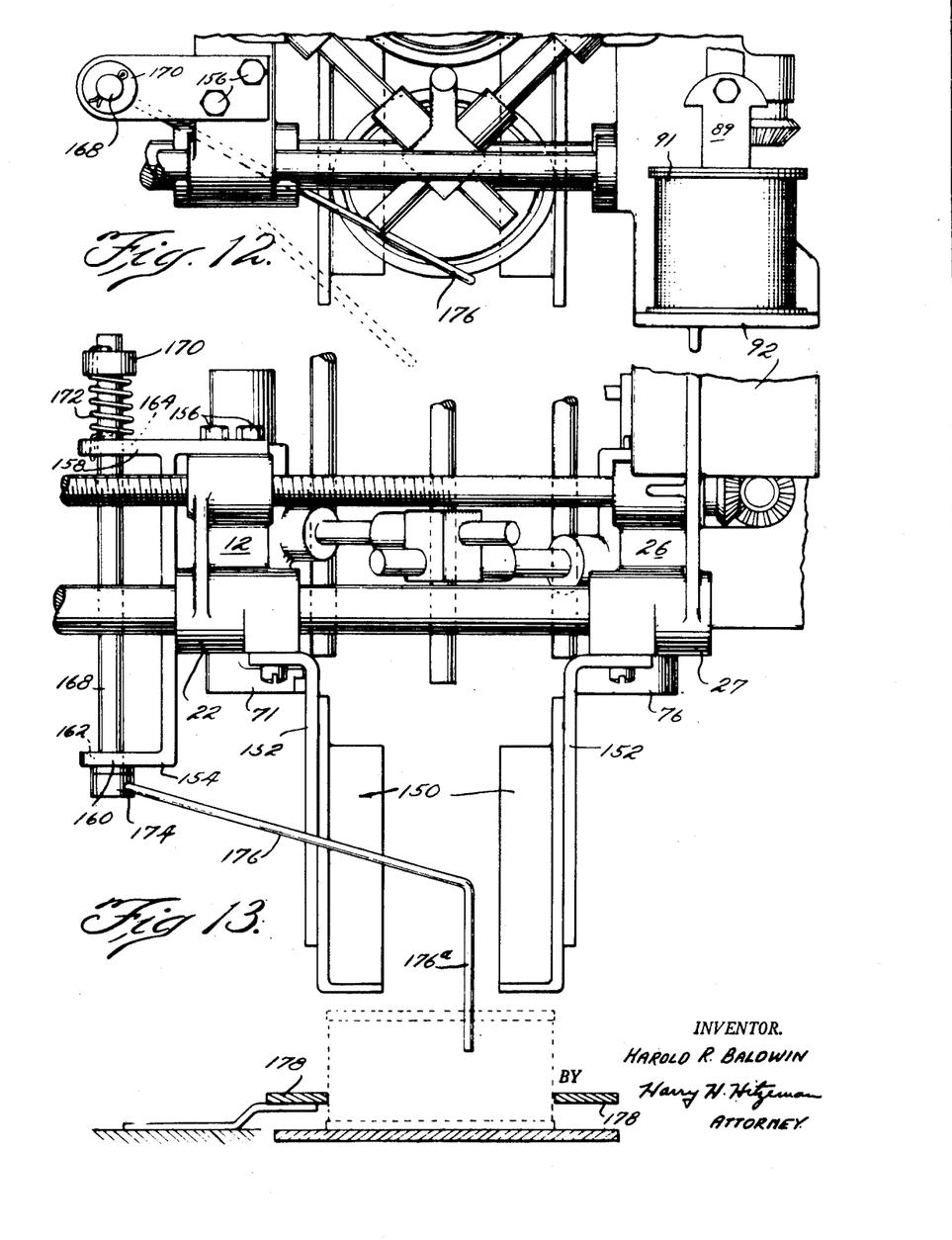
Fig. 12 is a fragmentary plan view showing the manner in which the cover centering device of a modified construction is operated.
Fig. 13 is a fragmentary front elevational view showing the can slideway, the cover centering device and associated parts.

The operation of my improved can cover centering device is as follows: As a can 111 travels forward on the conveyor 11 between the guides 178, and the automatic trip 110 actuates the cams 71 and 76 to release a cover 69, the same is dropped upon the angularly disposed conveyor form by the angle irons 150. By gravity the same will slide downwardly until they contact the portion 176a of the automatic cover centering member 176. As the can 111 comes forward its front edge will bear against the extension 176a and move the centering device in an arc about the rod 168. This permits the cover 69 to fall forward and engage in the groove in the top of the can. Further forward movement will cause the extension 176a to gradually move around the side of the can and the cover thus accurately centering the cover upon the can.

In view of the fact that one of the angle members 150 is connected to the casting 26 and the other angle member 150 is connected to the casting 12, it will be obvious that the conveyor thus formed is adjustable with the cover magazine and associated parts. While the downward extension 176a of the centering device is thus either central of the angles or to one side or another, it will be obvious that it will operate just as effectively due to the fact that it is swung out of position against the movement of coiled spring 172. It will always travel in an arc along the edge of the can passing through the machine and thus will always effectively center the cover on the can.

Figures 8, 14:
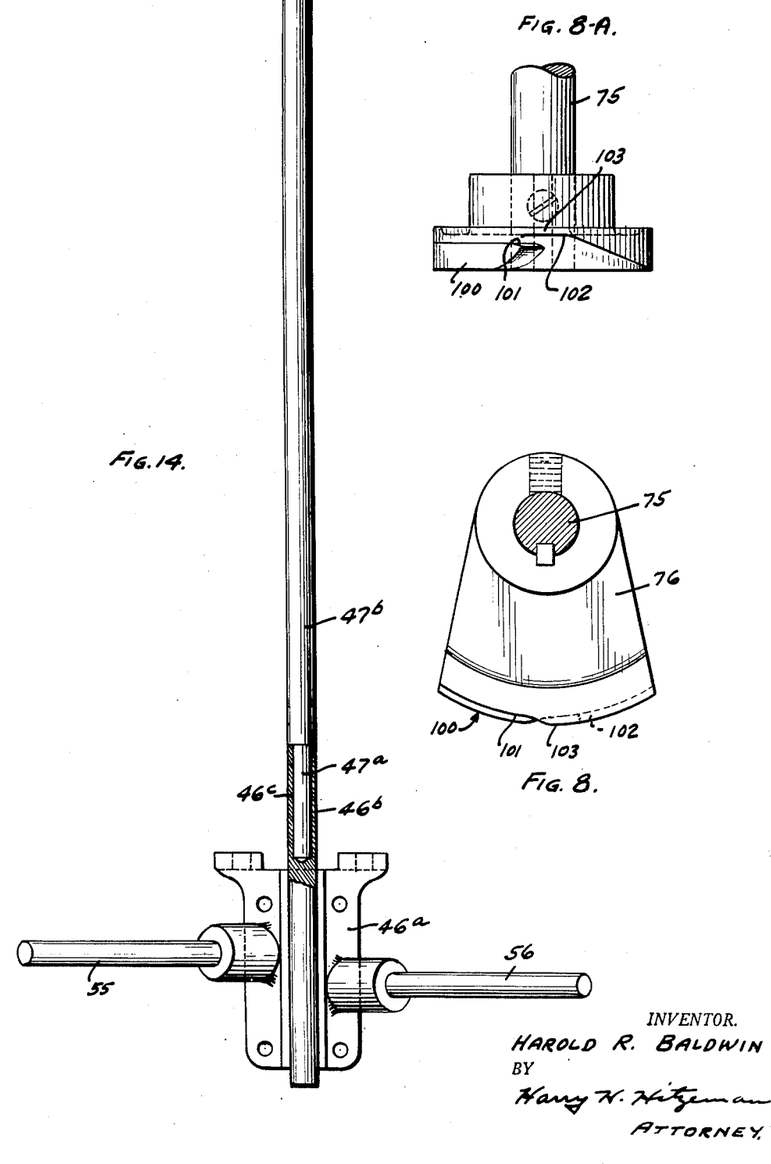
Fig. 8 is a front view of one of the release cams.
Fig. 14 is a front view of one of the magazine rod bearings with the removable stack rod mounted therein.

In Fig. 14 I have shown a modified form of the invention wherein the bracket 46a is provided with a post 46b having a socket 46c therein to receive the reduced end 47a of a vertical rod or post 47b. This is to provide for removal of the post so that the magazine can be easily and simply loaded whenever the stack of can covers becomes depleted.

Figure 15:
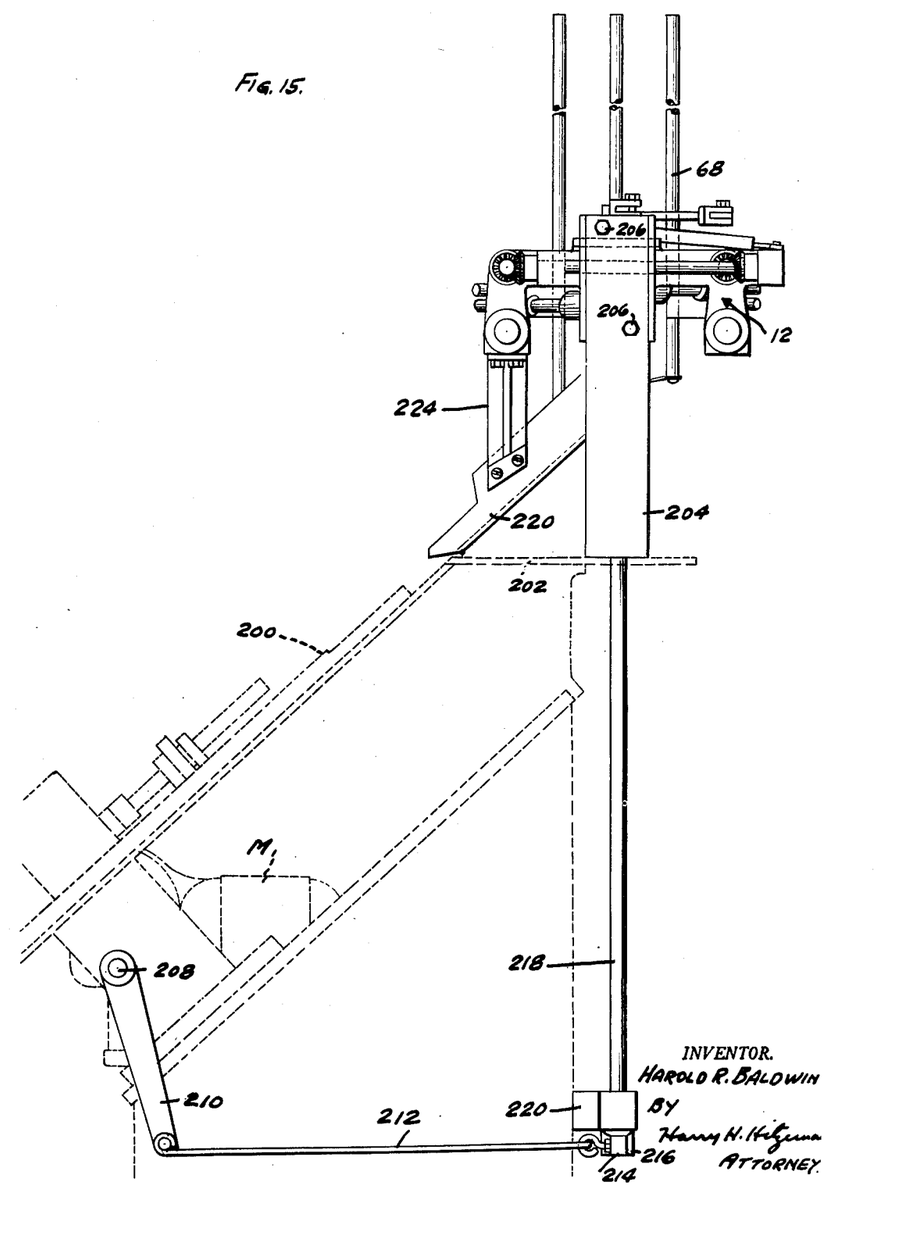
Fig. 15 is a side elevational view of the cap dropper mounted on a machine for performing further operations such as labeling etc., and the cap dropper is operated therefrom.

In Fig. 15 I have shown a modified form of construction wherein the cover dropper cams may be operated by means of a remotely located machine adapted to receive the covers for further operations thereon.

The machine 200 (shown in dotted lines) may have an upper platform 202 from which a pair of vertically disposed brackets 204 may extend and to which the cover dropper unit may be fastened by means of the bolt members 206.

In this construction a motor M which drives the machine 200 is also adapted to oscillate a shaft 208 extending horizontally to one side thereof. A lever 210 which is keyed to the shaft 208 may be connected by means of a rod 212 to the extended end 214 of a lever 216. The lever 216 is keyed to a vertically disposed shaft 218 mounted in a suitable bearing 220 on the side of the machine 200 and extending upwardly to carry one of the cam members 76. Suitable linkage such as previously described will connect the cam 76 with the opposed cam 71. Thus, when it is desired to operate the cams 71 and 76 to release the lowermost can cover from the magazine, it is done by means of the oscillation of lever 210 in synchronism with the operation of the machine 200, the cans being dropped on the incline chute 228 which is held below the cover dropper unit by means of a pair of side brackets 224.

From the above and foregoing description it can be seen that I have provided a highly efficient and flexible construction of cover dropper mechanism, one capable of operation by means of electrical or mechanical drives associated therewith to operate in connection with the movement of cans or a conveyor beneath the dropper or one operable in connection with the operation of another machine whereby the timed dropping of the covers is directly controlled by the action of this machine.

With the removable stack post which I have provided, it can be seen that it is a simple and easy matter to reload the magazine when the stack of covers becomes depleted. Also, with the improved cam construction, as each of the cams is oscillated in opposite directions, the tapered lip portions will have a tendency to force individual can covers downwardly from the bottom of the pile without disturbing or raising the stack in the magazine.

While I have illustrated and described a specific embodiment of my invention, it will be apparent to those skilled in the art that changes and modifications may be made in the exact details shown and I do not wish to be limited in any particular; rather what I desire to secure and protect by Letters Patent of the United States is:

1. In apparatus of the class described, the combination with a horizontal conveyor adapted to move cans forward in a continuous stream in a straight line, of an adjustable magazine for holding can ends positioned above said conveyor, said magazine constructed of four vertical rod members arranged to form a square, a pair of brackets for supporting two opposed rod members and a pair of floating blocks for supporting the other two opposed rod members, said floating blocks slidably mounted on intersecting rods extending from said brackets, adjusting screws connected to said brackets, a frame for supporting said screws, means associated with said screws for moving said brackets and floating blocks apart or together simultaneously, a pair of rotatable studs extending downward from said brackets, cam members secured to said studs and means adapted to oscillate said cam members to drop the lowermost cover from said magazine whenever a can comes into position below the same, said means connected to a can-operating machine.

2. In apparatus of the class described, the combination with a horizontal conveyor adapted to move cans forward in a continuous stream in a straight line, of an adjustable magazine for holding can ends positioned above said conveyor, said magazine constructed of four vertical rod members arranged to form a square, a pair of brackets for supporting two opposed rod members and a pair of floating blocks for supporting the other two opposed rod members, said floating blocks slidably mounted on intersecting sets of rods extending from said brackets, adjusting screws connected to said brackets, a frame for supporting said screws, means associated with said screws for moving said brackets and floating blocks apart or together simultaneously, a pair of rotatable studs extending downward from said brackets, cam members secured to said studs and means adapted to oscillate said cam members to drop the lowermost cover from said magazine whenever a can comes into position below the same, said means connected to a can-operating machine, said means including a lever connected to one of said studs and an arm connected between said lever and said can-operating machine.

3. In apparatus of the class described the combination with a horizontal conveyor adapted to move cans forward in a continuous stream in a straight line, of an adjustable magazine for holding can ends positioned above said conveyor, said magazine constructed of four upright vertical rod members forming a square, a pair of brackets for supporting two of said rod members, a pair of slide rods extending diagonally from both of said brackets, each pair intersecting the other at their ends, floating bearing blocks mounted on both pairs of slide rods at their intersections, the other two of said upright vertical rod members sopported by said bearing blocks, adjusting screws connected to said brackets, a frame for supporting said screws, means associated with said screws for moving said brackets apart or together simultaneously, a pair of studs extending downwardly from said brackets, cam members secured to the lower ends of said studs and means including a trip member positioned in the path of cans upon said horizontal conveyor and adapted to oscillate said cam members to drop a cover from said magazine whenever a can comes into position below the same, said cam members adapted to separate can covers from the bottom of a stack in said magazine.

4. In apparatus of the class described, the combination with a horizontal conveyor adapted to move cans forward in a continuous stream in a straight line, of an adjustable magazine for holding can ends positioned above said conveyor, said magazine constructed of a plurality of vertical rod members including a pair of brackets, a vertical rod member mounted on each bracket, intersecting slide rods extending diagonally from each bracket, a pair of floating blocks mounted on both sets of slide rods at their intersections, a vertical rod member mounted on each floating block, adjusting screws connected to said brackets, a frame for supporting said screws, means associated with said screws for moving said brackets apart or together simultaneously, a pair of studs extending downwardly from said brackets, a cam member secured to the lower end of one of said studs, the other extending downwardly and having a lever connected thereto and means to oscillate said cams, said means including an arm connected between a machine which receives the covers and said lever and adapted to oscillate the same.

HAROLD R. BALDWIN.

REFERENCES CITED

The following references are of record in the file of this patent:

UNITED STATES PATENTS

| Number | Name | Date |
|---|---|---|
| 1,041,787 | Henry | Oct. 22, 1912 |
| 1,058,372 | Kruse | Apr. 8, 1913 |
| 1,162,157 | Gray | Nov. 30, 1915 |
| 1,270,923 | Brenzinger | July 2, 1918 |
| 1,737,569 | Cameron | Dec. 3, 1929 |
| 1,864,422 | Flook | June 21, 1932 |
| 1,884,683 | Hermani | Oct. 25, 1932 |
| 1,916,255 | Cabot | July 4, 1933 |
| 2,085,767 | Reid | July 6, 1937 |
| 2,347,668 | Davies | May 2, 1944 |